United States Patent
Chang

(10) Patent No.: US 6,917,757 B1
(45) Date of Patent: Jul. 12, 2005

(54) IMAGE-CAPTURING DEVICE WITH SYNCHRONOUS AND AUTOMATIC FOCUSING FUNCTION

(75) Inventor: Shan-Wen Chang, Chang-Hua Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/709,985

(22) Filed: Jun. 10, 2004

(30) Foreign Application Priority Data

Mar. 3, 2004 (TW) ........................ 93105619 A

(51) Int. Cl.[7] .................. G03B 13/20; G03B 17/20
(52) U.S. Cl. .................. 396/139; 396/428; 355/55
(58) Field of Search ............ 396/89, 103, 130, 396/138, 139, 419, 420–422, 424, 428, 429, 544; 355/55–62; 348/345, 357, 373, 375, 376

(56) References Cited

U.S. PATENT DOCUMENTS

| | | | | |
|---|---|---|---|---|
| 2,593,318 A | * | 4/1952 | Lehmann | 355/62 |
| 2,785,597 A | * | 3/1957 | Gerard | 352/140 |
| 2,868,096 A | * | 1/1959 | Rothfjell | 396/420 |
| 2,951,429 A | * | 9/1960 | Leong | 396/138 |
| 3,263,589 A | * | 8/1966 | Rice | 396/89 |
| 3,601,028 A | * | 8/1971 | Tertocha | 248/222.14 |
| 3,625,607 A | * | 12/1971 | Bravenec | 355/56 |
| 3,735,686 A | * | 5/1973 | Brewer et al. | 355/55 |
| 5,028,941 A | * | 7/1991 | Sohn | 348/376 |
| 5,576,781 A | * | 11/1996 | Deleeuw | 396/6 |

* cited by examiner

*Primary Examiner*—W. B. Perkey
(74) *Attorney, Agent, or Firm*—Winston Hsu

(57) ABSTRACT

An image capturing apparatus includes a lens for capturing an image of an object, focusing module for focusing the lens, and a focus-decisive module including at least one slide rod for measuring a distance between the lens and the object and for controlling the focusing module to focus the lens synchronously according to the distance.

8 Claims, 9 Drawing Sheets

IMAGE-CAPTURING DEVICE WITH SYNCHRONOUS AND AUTOMATIC FOCUSING FUNCTION

BACKGROUND OF INVENTION

1. Field of the Invention

The present invention relates to an image capturing apparatus with a synchronous focusing function, and more particularly, to an image capturing apparatus for focusing a lens synchronously according to a distance between an object and the lens measured by the image capturing apparatus.

2. Description of the Prior Art

Digital cameras have become popular digital products and are positioned to eventually replace conventional film cameras due to low prices and compatibility with other electronic peripherals. There are several shooting modes that can be used according to the distance between an object and a camera lens. When the object is very close to the lens, a user can choose a close-shoot mode (also called macro mode) in which the focus range is be limited within a specific closed-shoot distance so as to shorten the focusing time. If the focusing time is shorter, the accuracy will be increased since there is less chance environmental interruption during the focusing time. For example, please refer to FIG. 1. FIG. 1 is a relationship diagram of the step of a lens driven by a step motor and an object distance parameter. If the object distance parameter is larger, the best object distance is more approximate. When the camera is in the general-shoot mode, the moving range of the lens driven by the step motor is larger than the one in the close-shoot mode. As shown in the FIG. 1, a curve A is the relation curve of the step of the lens driven by the step motor and the object distance parameter in the general-shoot mode, and a curve B is the relation curve of the step of the lens driven by the step motor and the object distance parameter in the close-shoot mode. Compared with the general-shoot mode, the object parameter is more sensitive to the step of the lens driven by the step motor in the close-shoot mode. So in the undulating possible object distance range, the failure possibility due to environmental interruption will be increased. However in the close-shoot mode of the present digital camera, the calculating range of the best object distance is limited within a specific range. Nevertheless, no matter what shooting mode is used, the lens starts to move in steps driven by the step motor from a designated position. That is, the moving steps are all the same in every shoot mode. In the close-shoot mode, a processing module of the digital camera calculates the best object distance within a close-shoot range instead of within the moving step range, but the lens still needs to move using steps just like the other shoot modes.

In the conventional close-shoot mode, the lens of the camera still moves the same distance as in the other modes, so users might fail to shoot due to environmental interruption during the focusing period. Therefore, there is a need to shorten the focusing time in the close-shoot mode so that the shoot quality can be improved.

SUMMARY OF INVENTION

It is therefore a primary objective of the claimed invention to provide an image capturing apparatus with a synchronous focusing function for solving the abovementioned problem.

According the claimed invention, an image capturing apparatus includes a lens for capturing an image of an object, a focusing module for focusing the lens, and a focus-decisive module including at least one slide rod for measuring a distance between the lens and the object and for controlling the focusing module to focus the lens synchronously according to the distance.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
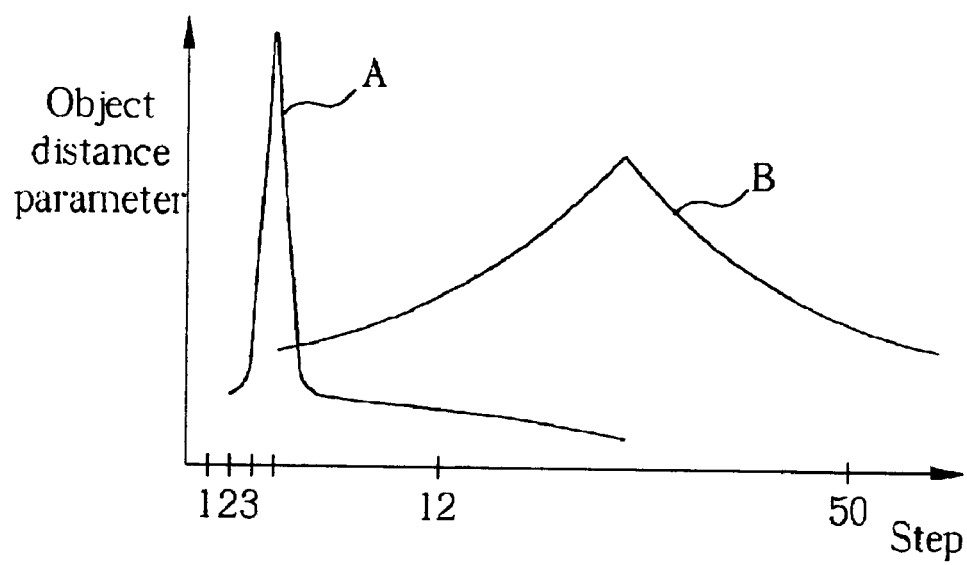
FIG. 1 is a relationship diagram of the step of a lens driven by a step motor and an object distance parameter.
Figure 2:
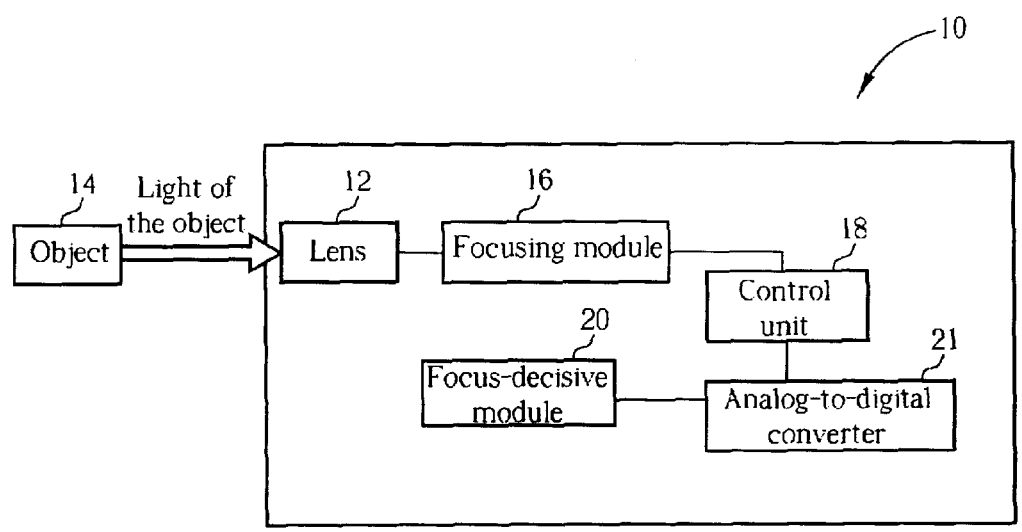
FIG. 2 is a functional block diagram of an image capturing apparatus according to the present invention.

Please refer to FIG. 2. FIG. 2 is a functional block diagram of an image capturing apparatus 10 according to the present invention. The image capturing apparatus 10 can be a digital camera or a conventional film camera. The image capturing apparatus 10 includes a lens 12 for capturing an image of an object 14, and a focusing module 16 for focusing the lens 12. The focusing module 16 can include a driving mechanism to move the lens 12, such as a motor. The image capturing apparatus 10 further includes a control unit 18 for controlling the image capturing apparatus 10, a focus-decisive module 20 for measuring a distance between the lens 12 and the object 14, and an analog-to-digital converter 21 for receiving an analog signal from the focus-decisive module 20, converting the analog signal into a digital signal, and transmitting the digital signal to the control unit 18.

Figure 3:
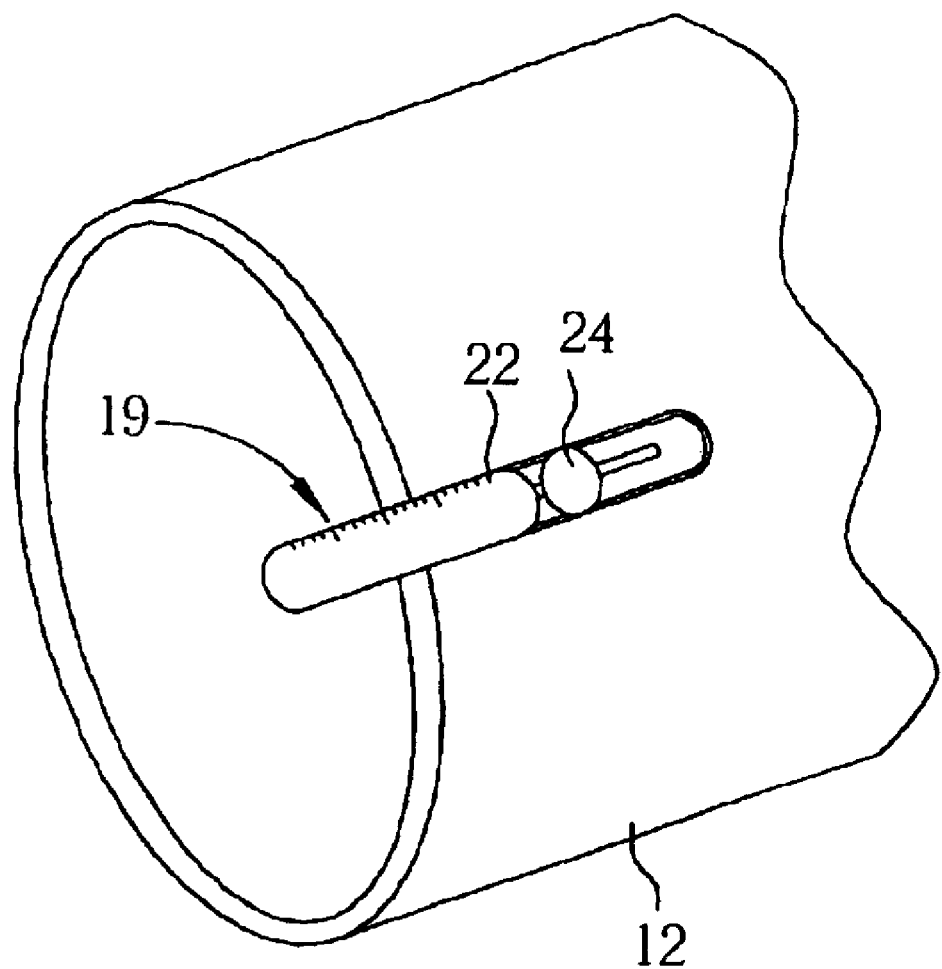
FIG. 3 is a schematic diagram of a focus-decisive module according to a first embodiment of the present invention.
Figure 4:
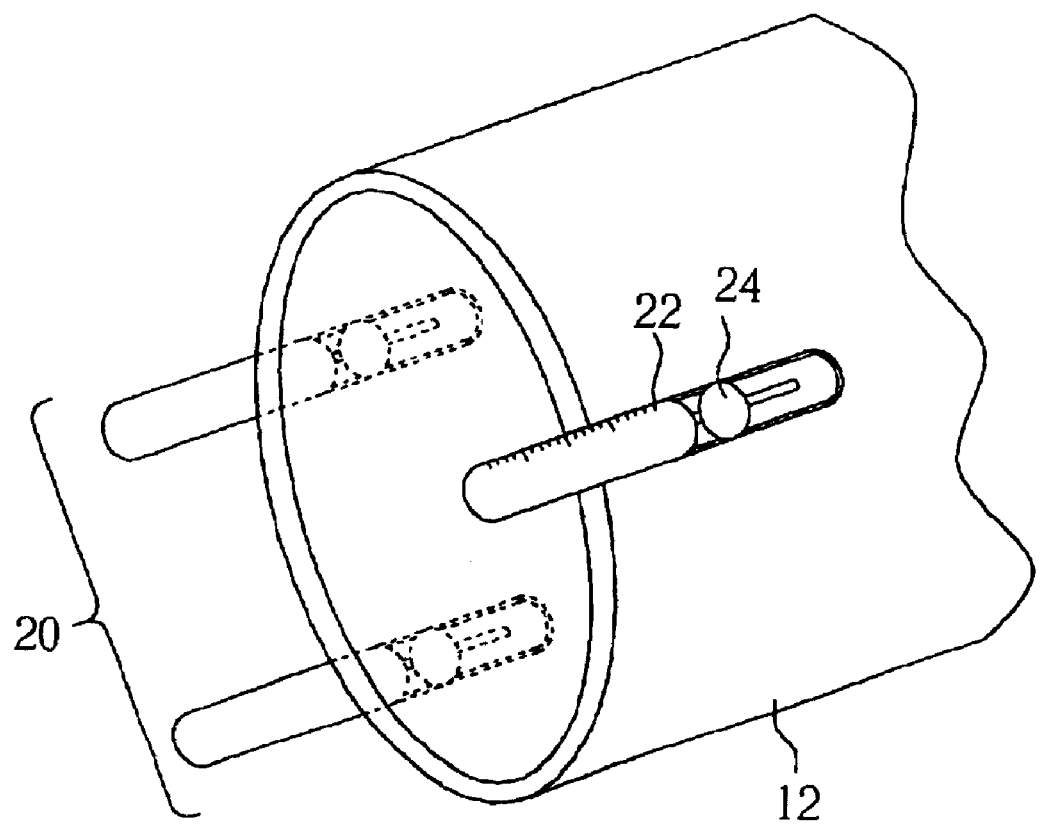
FIG. 4 is a schematic diagram of the focus-decisive module according to a second embodiment of the present invention.
Figure 5:
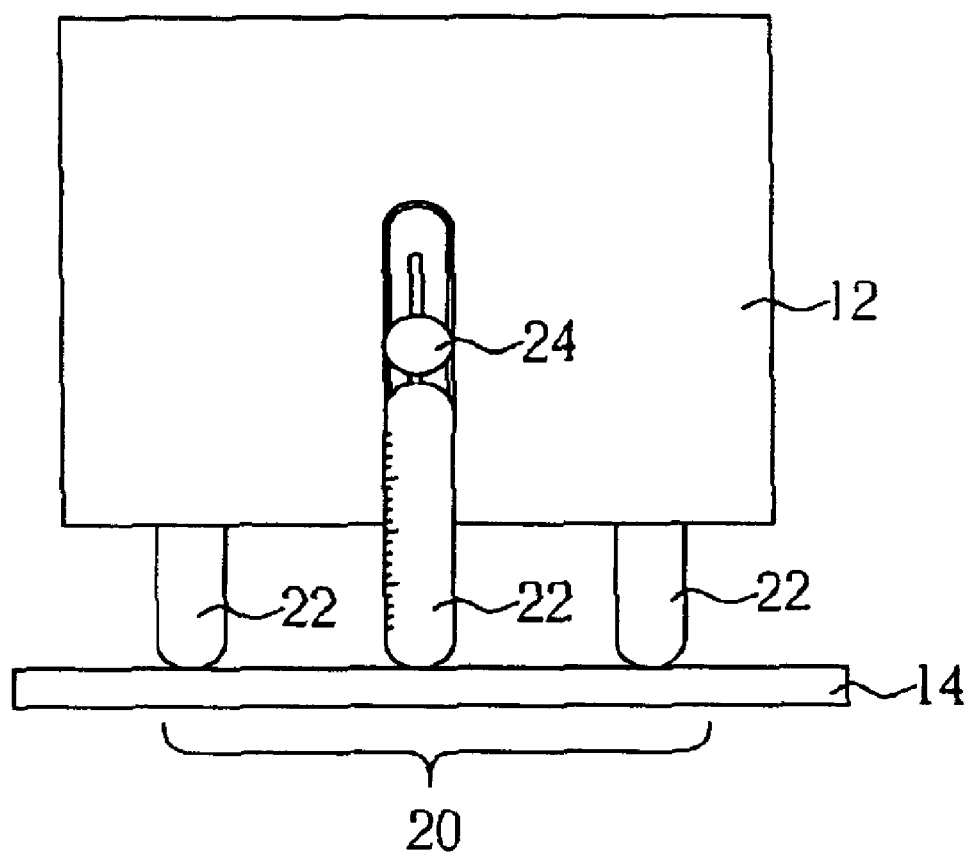
FIG. 5 is a schematic diagram of shooting the object with the focus-decisive module.

Please refer to FIG. 3. FIG. 3 is a schematic diagram of a focus-decisive module 19 according to a first embodiment of the present invention. The focus-decisive module 19 includes a slide rod 22 installed on a housing of the lens 12 for sliding on the housing of the lens 12 and measuring a distance between the object 14 and the lens 12, a stop device 24 installed on the housing of the lens 12 for fixing the slide rod 22 with a force to avoid sliding. A distance-measuring device is composed of the slide rod 22 and the stop device 24. That is, the distance between the slide rod 22 and the object 14 can be measured with the slide rod 22 and the object 14, and the distance can be presented with the scale on the slide rod 22. The focus-decisive module 19 is not limited to using the slide rod 22 and the stop device 24 or using one set of the slide rod 22 and the stop device 24. Please refer to FIG. 4. FIG. 4 is a schematic diagram of the focus-decisive module 20 according to a second embodiment of the present invention. The focus-decisive module 20 includes three slide rods 22 installed on the housing of the lens 12 for sliding on the housing of the lens 12 and measuring the distance between the object 14 and the lens 12, and three stop devices 24 installed on the housing of the lens 12 for fixing the slide rod 22 with a force to avoid sliding. A distance-measuring device is composed of a set of one slide rod 22 and one stop device 24. That is, the distance between the slide rod 22 and the object 14 can be measured with the set of the slide rod 22 and the object 14, and the distance can be presented with the scale on the slide rod 22. The three slide rods 22 and their corresponding stop devices 24 are linked together. That is, the movements of the three slide rods 22 are identical so as to calculate the distance between the object 14 and the lens 12. Please refer to FIG. 5. FIG. 5 is a schematic diagram of shooting the object 14 with the focus-decisive module 20. When the user uses the image capturing apparatus 10 to capture an image of the object 14 when the lens 12 is very close to the object 14 so as to use the close-shoot mode, the slide rods 22 can jut out of the housing of the lens 12 and press against the object 14. At this time, the stop devices 24 can be used in fixing the slide rods 22 so as to prevent the slide rods 22 from sliding on the housing of the lens 12. Therefore, first the lens 12 can be supported above the object 14 with the slide rods 22, and secondly the distance between the lens 12 and the object 14 can be measured.

Figure 6:
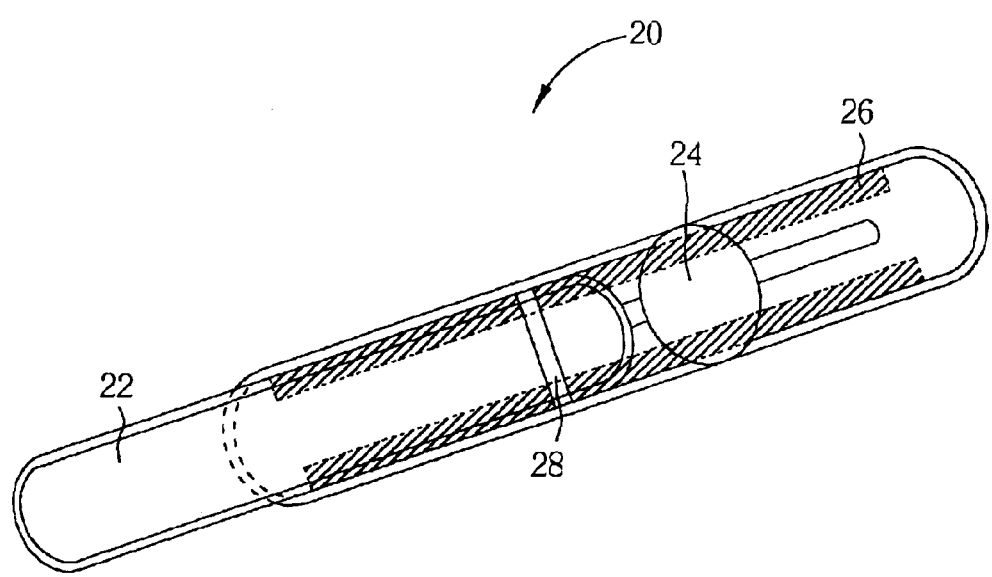
FIG. 6 is a perspective drawing of the focus-decisive module.
Figure 7:
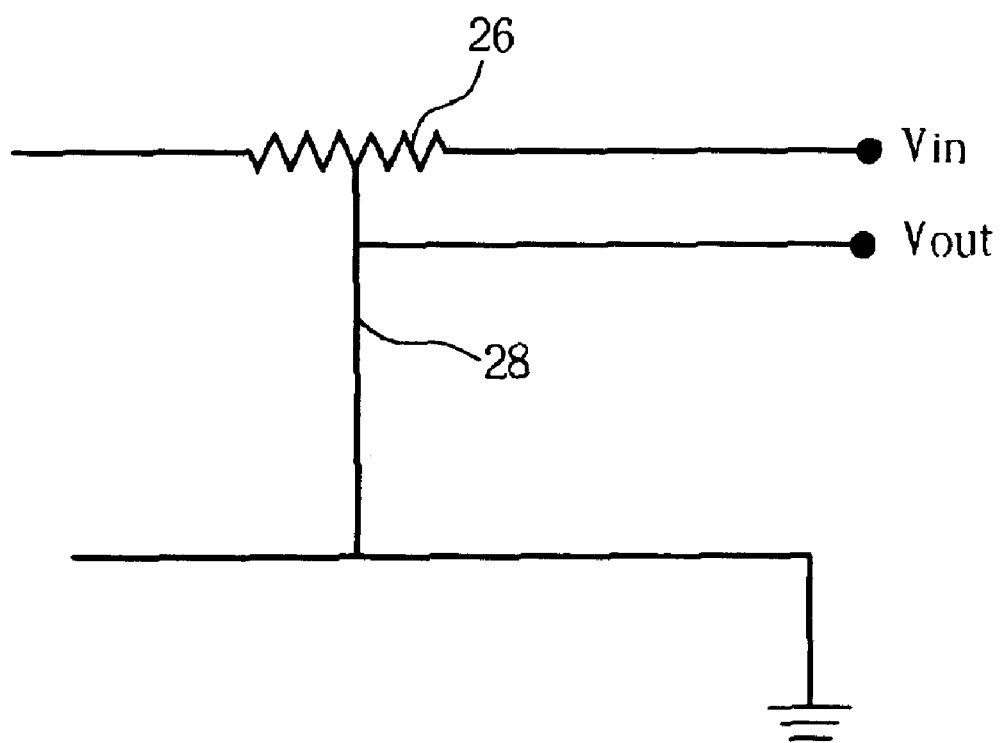
FIG. 7 is an equivalent circuit diagram of the focus-decisive module.

Please refer to FIG. 6. FIG. 6 is a perspective drawing of the focus-decisive module 20. The focus-decisive module 20 further includes a variable resistance 26 connected to the slide rod 22, and a bar 28 installed inside the slide rod 22 to connect to different parts of the variable resistance 26 according to the sliding movement of the slide rod 22. Please refer to FIG. 7. FIG. 7 is an equivalent circuit diagram of the focus-decisive module 20. An output voltage Vout of the bar 28 can be generated by inputting an input voltage Vin to the variable resistance 26 according to the location on the variable resistance 26 of the bar 28. Therefore according to the proportional relation of the input voltage Vin and the output voltage Vout, the location on the variable resistance 26 of the bar 28 can be measured so that the distance between the lens and the object 14 can be measured according to the distance of the slide rod 22 jutting out of the lens 12.

Please refer to FIG. 2, FIG. 5, and FIG. 7. When the slide rods 22 of the focus-decisive module 20 slide against the object 14 and are fixed by the stop devices 24, the focus-decisive module 20 can generate the output voltage Vout shown in FIG. 7 to the analog-to-digital converter 21. The analog-to-digital converter 21 converts the analog voltage signal transmitted from the focus-decisive module 20 into a digital signal, and transmits the digital signal to the control unit 18. The control unit 18 receives the digital signal transmitted from the analog-to-digital converter 21 and calculates the distance between the object 14 and the lens 12 according to the digital signal so as to control the focusing module 16 to focus the lens 12. However only one of the three slide rods 22 can output the information of the sliding movement, and the other two slide rods 22 only provide the function of supporting the lens 12.

Figure 8:
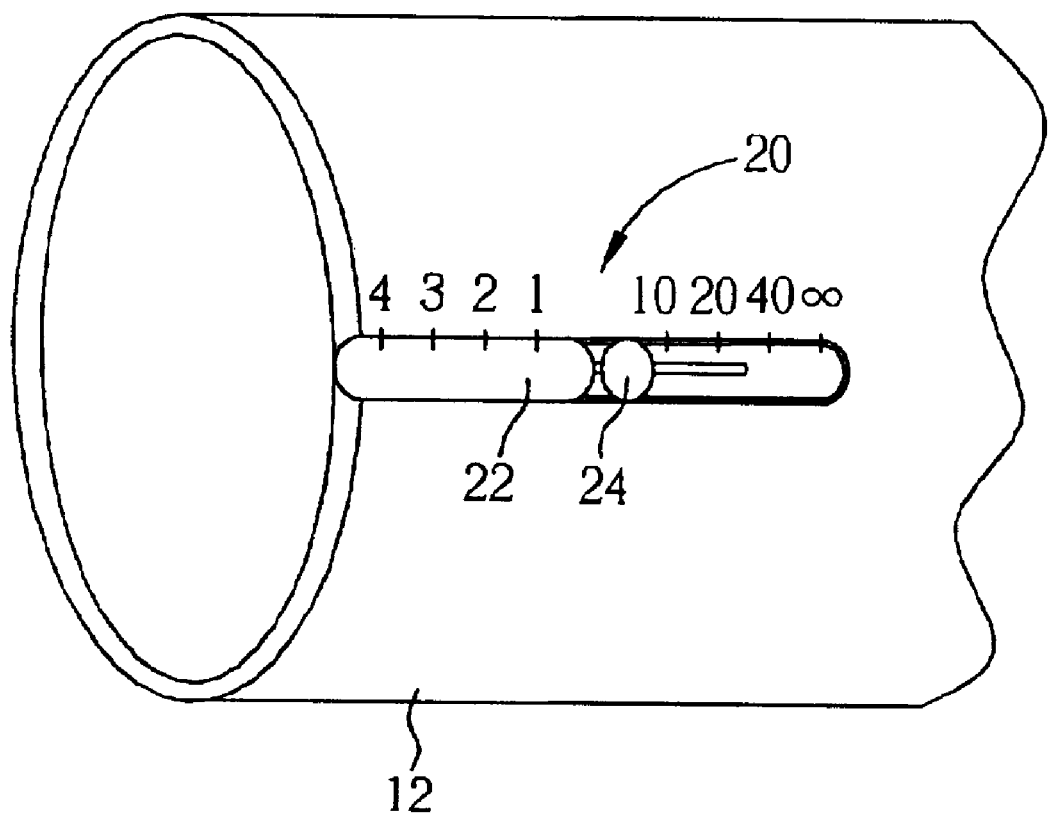
FIG. 8 is a schematic diagram of inputting a focus range of a focusing module with a slide rod.

Please refer to FIG. 8. FIG. 8 is a schematic diagram of inputting a focus range of the focusing module 16 with the slide rod 22. For example, when the close-shoot mode of the image capturing apparatus 10 applies to a situation in which the distance between the object 14 and the lens is close to 4 cm, the slide rod 22 of the focus-decisive module 22 can be jutted out of the housing of the lens 12 at a four-centimeter distance or at a distance greater than 4 cm so that the automatic focusing operation can be processed according to the distance between the lens and the object 14 measured with the slide rod 22. When the slide rod 22 slides into positions corresponding to 10, 20, 40 or ∞ symbols on the housing, the focus range of the focusing module 16 is simultaneously set within the corresponding range. The setting of the focus range depends on the design demands. After setting the focus range, the focus-decisive module 20 can transmit the output voltage Vout shown in FIG. 7 to the analog-to-digital converter 21. The analog-to-digital converter 21 converts the analog voltage signal transmitted from the focus-decisive module 20 into a digital signal, and transmits the digital signal to the control unit 18. The control unit 18 receives the digital signal transmitted from the analog-to-digital converter 21 and calculates the distance between the object 14 and the lens 12 or the limiting focus range of the focusing module 16 according to the digital signal so as to control the focusing module 16 to focus the lens 12 synchronously.

Figure 9:
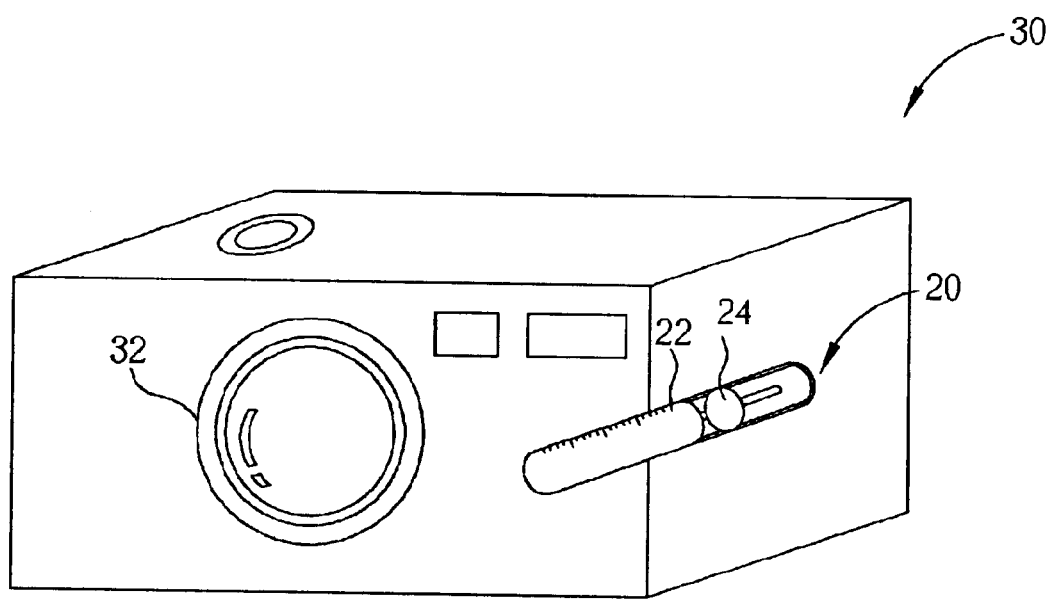
FIG. 9 is a schematic diagram of an image capturing apparatus according to a third embodiment of the present invention.

In addition, if the lens of the image capturing apparatus is an inner adjustable lens (that is, the lens expands and contracts inside the housing of the image capturing apparatus), the focus-decisive module 20 can be installed on the housing of the image capturing apparatus. Please refer to FIG. 9. FIG. 9 is a schematic diagram of an image capturing apparatus 30 according to a third embodiment of the present invention. The image capturing apparatus 30 includes a housing 32, an inner lens 34 installed inside the housing 32, and the focus-decisive module 20 installed on the housing 32. Because the inner lens 34 extends and contracts inside the housing 32 of the image capturing apparatus 30, the focus-decisive module 20 cannot be installed on the housing of the lens as in the previous embodiments, and can be installed on the housing 32 of the image capturing apparatus 30. The working principle of the slide rod 22 and the stop device 24 is the same as the previous embodiment, so the detailed description is omitted.

In contrast to the prior art, the image capturing apparatus according to the present invention can process the automatic focus operation synchronously according to the distance between the object and the lens measured with the focus-decisive module. Hence the image capturing apparatus according to the present invention has advantages of shortening the focus time, and increasing the focus accuracy and the stability. As for shortening the focus time, the slide rod of the focus-decisive module generates the distance between the object and the lens; meanwhile, the lens of the image capturing apparatus moves to the corresponding shoot position by adjusting the slide rod to measure the distance between the lens and the object instead of the prior art lens that starts to move in steps driven by the step motor from a designated position. That is, the moving steps are all the same in every shoot mode. In the close-shoot mode, a processing module of the digital camera calculates the best object distance within a close-shoot range instead of within the moving step range, but the lens still needs to move using steps just like the other shoot modes.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image capturing apparatus comprising:

a lens for capturing an image of an object;

a focusing module for focusing the lens; and a focus-decisive module comprising at least one slide rod for measuring a distance between the lens and the object and for controlling the focusing module to focus the lens synchronously according to the distance.

2. The image capturing apparatus of claim 1 wherein the focus-decisive module further comprises a variable resistance connected to the slide rod, wherein the quantity of the variable resistance is changeable by sliding the slide rod, and the image capturing apparatus further comprises an analog-to-digital converter for receiving an analog signal of voltage decided by the variable resistance and converting the analog signal into a digital signal, and a control unit for receiving the digital signal transmitted from the analog-to-digital converter and generating the distance between the object and the lens according to the digital signal so as to control the focusing module to focus the lens.

3. The image capturing apparatus of claim 1 wherein the focus-decisive module further comprises a stop device for fixing the slide rod with a force to avoid sliding.

4. The image capturing apparatus of claim 3 wherein the slide rod of the focus-decisive module is capable of supporting the lens positioned above the object.

5. The image capturing apparatus of claim 1 wherein the slide rod of the focus-decisive module is used in inputting a focus range of the focusing module.

6. The image capturing apparatus of claim 1 wherein the slide rod of the focus-decisive module is installed on a housing of the lens.

7. The image capturing apparatus of claim 6 wherein the focus-decisive module comprises three slide rods installed on the housing of the lens.

8. The image capturing apparatus of claim 1 wherein the image capturing apparatus is a camera.

* * * * *